No. 803,907. PATENTED NOV. 7, 1905.
W. K. KIGHT.
LENS FOR EYEGLASSES.
APPLICATION FILED MAY 11, 1905.

Witnesses:
G. A. Pennington
A. J. McCauley

Inventor:
William K. Kight,
by Bakewell Cornwall
Attys.

UNITED STATES PATENT OFFICE.

WILLIAM K. KIGHT, OF DEXTER, MISSOURI, ASSIGNOR OF ONE-THIRD TO ROBERT F. JEAN, OF DEXTER, MISSOURI.

LENS FOR EYEGLASSES.

No. 803,907.     Specification of Letters Patent.     Patented Nov. 7, 1905.

Application filed May 11, 1905. Serial No. 259,977.

*To all whom it may concern:*

Be it known that I, WILLIAM K. KIGHT, a citizen of the United States, residing at Dexter, Stoddard county, Missouri, have invented a certain new and useful Improvement in Lenses for Eyeglasses, of which the following is a full, clear, and exact description, such as will enable others skilled in the art to which it appertains to make and use the same, reference being had to the accompanying drawings, forming part of this specification, in which—

Figure 1:
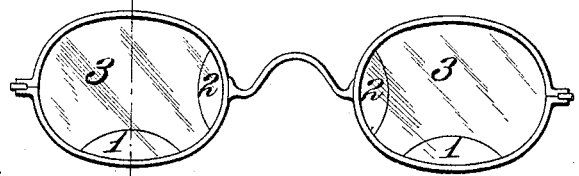
Figure 1A:
Figure 2:
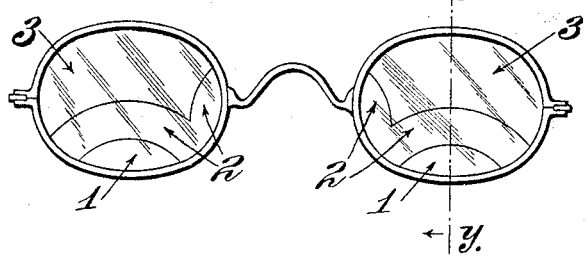
Figure 3:
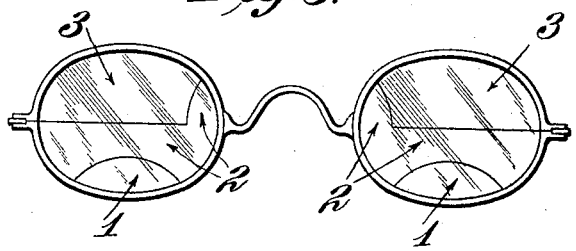
Figure 4:
Figure 5:
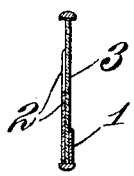
Figure 6:

Figure 1 is an elevational view of a pair of eyeglasses, showing my improved lenses in position therein. Fig. 1ª is a cross-sectional view on the line $xx$ of Fig. 1. Figs. 2 and 3 are similar views of modified forms of lenses, and Figs. 4, 5, and 6 are cross-sectional views showing modified forms of lenses.

This invention relates to a new and useful improvement in eyeglasses, and particularly the lenses thereof, one of the objects being to construct the lens so that the point of vision is focalized at different distances in the different uses of the lens; and another object is to provide a lens designed particularly for use of hunters or those shooting with a rifle or shotgun at an object or target.

In the drawings I have shown several forms of lenses for carrying out my invention, and it is obvious that these lenses can be made up by the attachment of separate wafers or by grinding, as is well known in this art. Therefore I do not wish to be understood as limiting my invention to any particular method of manufacturing or constructing the lens.

Referring now to Fig. 1, 1 is a field or vision, which is preferably focalized at about fifteen inches for close reading, said field being located in the lower portion of the lens, its vertical depth being sufficiently reduced, so that it is not in the line of sight when the wearer is walking. The fields or visions 2 are preferably located on the inner ends of the lenses adjacent the nose, these visions, known as "intermediate" visions, being focalized at about thirty inches, or such distance as will supply normal vision on the sight of a gun. Vision or field 3 is the normal distant vision, focalized at the usual distance of about twenty feet.

It is designed that the wearer in shooting shall employ both eyes, otherwise if the line of sight as the head is tilted to glance along the barrel of the gun—say when the marksman is shooting from the right shoulder—is through the vision 2 it will be obvious that were the left eye closed any objects within or beyond the focal range of vision 2 would be blurred or obscured. It will also be obvious that should the line of sight pass through the long-distance vision 3 the sight on the gun would be out of focus, as would also be the case if the gun were sighted through vision 1.

Assuming that the line of sight of the right eye passes through vision 2, in which case the sights on the gun are in focus, and the left eye is open, its line of sight being through the long-distance vision 3, the object aimed at is brought within the focal range of vision 3 at the same time that the sights on the gun are within the focal range of vision 2. Under these conditions the two visions become so blended that the resultant accommodation is substantially equivalent to normal vision. Where the marksman shoots from the right shoulder, it is obvious that the field or vision 2 on the right-hand lens will be brought into right position, in which event the field or vision 2 on the left-hand lens will be unnecessary.

In speaking of the field or vision 3 as a long-distance vision it is obvious that this lens could be an ordinary plano glass or weak or strong, as occasion demands.

In Figs. 1 to 4, inclusive, the long-distance field or vision 3 is shown as an elliptically-shaped lens, upon one side of which is pasted a wafer constituting the intermediate field or vision 2, and on wafer 2 is pasted a third wafer constituting the short-distance-reading field or vision 1, each of the lenses or wafers being ground to suit the eyes of the wearer and focalized at the desired distance.

In Fig. 5 the wafer forming the intermediate field or vision is secured to one side of the long-distance lens 3, while the wafer transmitting the short-distance-reading field or vision is secured on the opposite side of said lens 3.

In Fig. 6 the lenses constituting the three fields or visions are formed of crystal of substantially the same thickness, each being cut so as to fit the other and all arranged in the same vertical plane and secured in the frame.

For the particular uses to which the trifocal lens above described is especially adapted it is preferable that the field or vision 2 shall be located at the inner end of the lens and extend above the line through the major axis of the lens.

In Fig. 2 the above conditions are observed; but in this instance the field or vision 2 is extended laterally, so as to be useful to the wearer in looking straight ahead as well as obliquely. In this the upper portion of the field or vision 2 is on a curved line, while in Fig. 3 the line is substantially straight.

Having thus described the invention, what is claimed as new, and desired to be secured by Letters Patent, is—

1. In a lens for eyeglasses, the combination with a long-distance field or vision, and a short-distance field or vision arranged to one side thereof and extending above the major axis of the long-distance lens; substantially as described.

2. In a lens for eyeglasses, the combination with a lens focalized for long distances, and a lens for short distances located to one end of the long-distance lens and extending above and below the major axis thereof; substantially as described.

3. The herein-described lens for eyeglasses, the same comprising a reading vision or field 1 located in the lower portion of the lens, an intermediate vision or field 2 located at one side of the lens, and a long-distance vision or field 3 constituting the remaining portion of the lens; substantially as described.

4. The herein-described lens for eyeglasses, the same comprising a reading vision or field 1 located in the lower portion of the lens, an intermediate vision or field 2 extending at one side of the lens above the major axis thereof, said field or vision 2 thence extending laterally over the field or vision 1, said laterally-extending portion being below the major axis of the lens, and a long-distance field or vision 3 constituting the remaining portion of the lens; substantially as described.

5. In a lens for eyeglasses, the combination with a long-distance field or vision, and a short-distance field or vision arranged to one side thereof whereby when the wearer's line of sight is directed obliquely said line, with respect to one eye, will pass through the short-distance field or vision, and the line of sight from the other eye will pass through the long-distance field or vision; substantially as described.

In testimony whereof I hereunto affix my signature, in the presence of two witnesses, this 8th day of May, 1905.

WILLIAM K. KIGHT.

Witnesses:
F. R. CORNWALL,
GEORGE BAKEWELL.